(12) United States Patent
Sullivan et al.

(10) Patent No.: US 10,595,084 B2
(45) Date of Patent: *Mar. 17, 2020

(54) TELEVISION CHANNEL DISPLAY DEVICE AND METHOD THEREOF

(71) Applicant: AT&T Intellectual Property I, L.P., Atlanta, GA (US)

(72) Inventors: Marc Sullivan, Austin, TX (US); Gregory Edwards, Austin, TX (US); Joan Pearl, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/367,495

(22) Filed: Mar. 28, 2019

(65) Prior Publication Data
US 2019/0222896 A1   Jul. 18, 2019

Related U.S. Application Data

(63) Continuation of application No. 15/899,836, filed on Feb. 20, 2018, now Pat. No. 10,284,911, which is a
(Continued)

(51) Int. Cl.
| | |
|---|---|
| *H04N 7/173* | (2011.01) |
| *H04N 21/45* | (2011.01) |
| *H04N 21/4227* | (2011.01) |
| *H04N 21/431* | (2011.01) |
| *H04N 21/4335* | (2011.01) |
| *H04N 21/442* | (2011.01) |
| *H04N 21/482* | (2011.01) |
| *H04N 21/643* | (2011.01) |
| *H04N 7/16* | (2011.01) |
| *H04N 5/44* | (2011.01) |

(52) U.S. Cl.
CPC ......... *H04N 21/4516* (2013.01); *H04N 7/163* (2013.01); *H04N 21/4227* (2013.01); *H04N 21/4312* (2013.01); *H04N 21/4314* (2013.01); *H04N 21/4335* (2013.01); *H04N 21/44209* (2013.01); *H04N 21/482* (2013.01); *H04N 21/64322* (2013.01); *H04N 5/4401* (2013.01); *H04N 7/17363* (2013.01)

(58) Field of Classification Search
CPC ............... H04N 7/163; H04N 7/17363; H04N 7/17318; H04N 7/173; H04N 5/50; H04N 5/4401
USPC ....... 348/725; 725/86–104, 2, 131, 139, 151
See application file for complete search history.

(56) References Cited

U.S. PATENT DOCUMENTS

| | | | |
|---|---|---|---|
| 8,713,607 B2 | 4/2014 | McEnroe et al. | |
| 2005/0028208 A1* | 2/2005 | Ellis ...................... | H04N 7/163 725/58 |

(Continued)

*Primary Examiner* — Jefferey F Harold
*Assistant Examiner* — Omer Khalid
(74) *Attorney, Agent, or Firm* — Guntin & Gust, PLC; Andrew Raymond

(57) ABSTRACT

An Internet Protocol television system includes a set-top box that receives requests to display video streams being transmitted to a household. In response to the request, the set-top box provides a list of the video streams to a display device. The list includes options to terminate transmission of one or more of the streams. This allows a user to determine which video streams should be transmitted when bandwidth limitations are reached.

20 Claims, 6 Drawing Sheets

Related U.S. Application Data continuation of application No. 15/451,451, filed on Mar. 7, 2017, now Pat. No. 9,936,251, which is a continuation of application No. 15/196,931, filed on Jun. 29, 2016, now Pat. No. 9,628,857, which is a continuation of application No. 11/868,138, filed on Oct. 5, 2007, now Pat. No. 9,414,019.

(56) References Cited

U.S. PATENT DOCUMENTS

| | | |
|---|---|---|
| 2005/0210522 A1 | 9/2005 | Wu et al. |
| 2007/0006259 A1 | 1/2007 | Kurose et al. |
| 2007/0056015 A1* | 3/2007 | Kortum .............. H04N 21/6338 725/134 |
| 2007/0106419 A1 | 5/2007 | Rachamadugu |
| 2007/0130588 A1* | 6/2007 | Edwards ................ H04N 7/163 725/59 |
| 2007/0150918 A1* | 6/2007 | Carpenter ............... G06F 21/10 725/25 |
| 2007/0157281 A1 | 7/2007 | Ellis |
| 2007/0180463 A1 | 8/2007 | Jarman |
| 2007/0192791 A1 | 8/2007 | Sullivan |
| 2007/0198718 A1 | 8/2007 | Savoor |
| 2008/0192820 A1 | 8/2008 | Brooks et al. |
| 2008/0244667 A1* | 10/2008 | Osborne ............ H04N 7/17318 725/94 |
| 2009/0064252 A1 | 3/2009 | Howarter et al. |
| 2009/0094654 A1 | 4/2009 | Sullivan et al. |
| 2012/0224501 A1 | 9/2012 | Boucher et al. |
| 2016/0309226 A1 | 10/2016 | Sullivan et al. |
| 2017/0180802 A1 | 6/2017 | Sullivan et al. |
| 2018/0176643 A1 | 6/2018 | Sullivan et al. |

* cited by examiner

TELEVISION CHANNEL DISPLAY DEVICE AND METHOD THEREOF

CROSS-REFERENCE TO RELATED APPLICATIONS

This application is a continuation of U.S. application Ser. No. 15/899,836, filed Feb. 20, 2018, which is a continuation of U.S. application Ser. No. 15/451,451, filed Mar. 7, 2017 (now U.S. Pat. No. 9,936,251), which is a continuation of U.S. application Ser. No. 15/196,931, filed Jun. 29, 2016 (now U.S. Pat. No. 9,628,857), which is a continuation of U.S. application Ser. No. 11/868,138, filed Oct. 5, 2007 (now U.S. Pat. No. 9,414,019), which are incorporated herein by reference in their entirety.

FIELD OF THE DISCLOSURE

This invention generally relates to television systems, and more particularly relates to Internet Protocol television systems.

BACKGROUND OF THE DISCLOSURE

Bandwidth limitations in an Internet Protocol television (IPTV) system may limit the number of video streams that can simultaneously be transmitted to a household. Moreover, it is possible for the household to request a number of video streams from the IPTV system that would exceed the bandwidth limitation. In this case the IPTV system will not transmit one or more of the requested video streams, which can result in a poor viewing experience.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
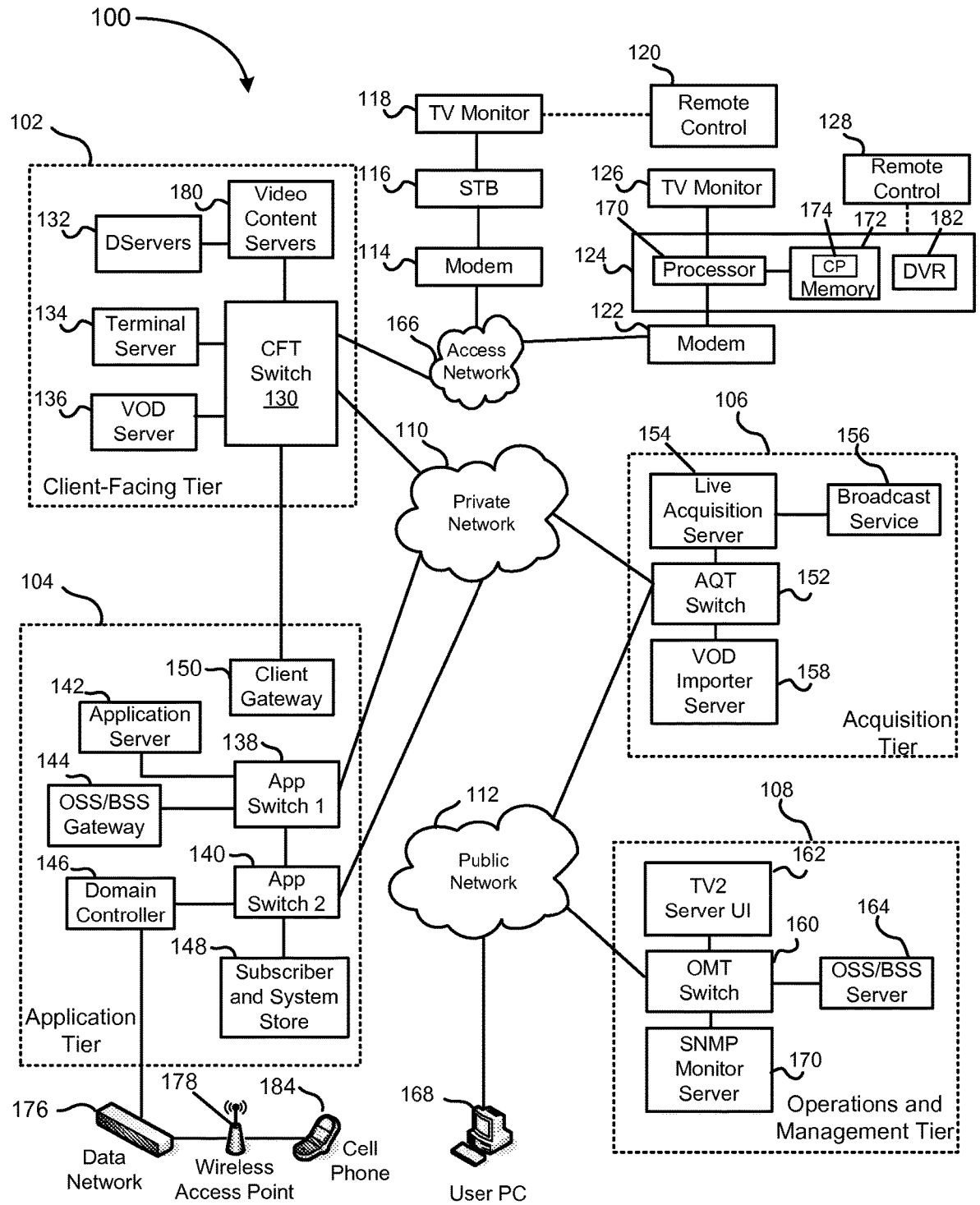
FIG. 1 is a block diagram illustrating a particular embodiment of an Internet protocol television (IPTV) system.

FIG. 1 shows an IPTV system 100 including a client-facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to a public network such as the Internet. The acquisition tier 106 can also be coupled to the private network 110 and to the public network 112. Moreover, the operations and management tier 108 can be coupled to the public network 112.

The various tiers 102, 104, 106 and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modems such as a first modem 114 and a second modem 122 can be coupled to the private access network 166. The client-facing tier 102 can communicate with a first representative set-top box device 116 via the first modem 114 and with a second representative set-top box (STB) device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each STB device 116 and 124 can process data received from the private access network 166 via an IPTV software platform such as Microsoft™ TV IPTV Edition.

The first STB device 116 can be coupled to a first display device 118, such as a first television monitor, and the second STB device 124 can be coupled to a second display device 126, such as a second television monitor. Moreover, the first STB device 116 can communicate with a first remote control 120, and the second STB device 124 can communicate with a second remote control 128. In an exemplary embodiment, each STB device 116 and 124 can receive data or video from the client-facing tier 102 via the private access network 166 and render or display the data or video at the display device 118 or 126 to which it is coupled. The STB devices 116 and 124 thus may include tuners that receive and decode television programming information for transmission to the display devices 118 and 126. Further, the STB devices 116 and 124 can include an STB processor 170 and an STB memory device 172 that is accessible to the STB processor 170. In a particular embodiment, the STB devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material, and one or more video content servers 180. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the STB devices 116 and 124 via the private access network 166, so the STB devices 116 and 124 can provide functions such as display, messaging, processing of IPTV data and VOD material. In a particular embodiment, the OSS/BSS gateway 144 includes operation systems and support (OSS) data, as well as billing systems and support (BSS) data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the STB devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen STB devices from accessing the private network 110, by denying access to these devices beyond the private access network 166.

For example, when the STB device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the STB device 116 access to IPTV content and VOD content. If the client gateway 150 cannot verify subscriber information for the STB device 116, such as because it is connected to a different twisted pair, the client gateway 150 can deny transmissions to and from the STB device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 166 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch 152 can transmit the television content to the CFT switch 130 via the private network 110. Further, the television content can be encoded at the D-servers 132, and the CFT switch 130 can communicate the television content to the modems 114 and 122 via the private access network 166. The STB devices 116 and 124 can receive the television content from the modems 114 and 122, decode the television content, and transmit the content to the display devices 118 and 126 according to commands from the remote control devices 120 and 128.

Additionally, at the acquisition tier 106, the video-on-demand (VOD) importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136. When a user issues a request for VOD content to the STB device 116 or 124, the request can be transmitted over the private access network 166 to the VOD server 136 via the CFT switch 130. Upon receiving such a request, the VOD server 136 can retrieve requested VOD content and transmit the content to the STB device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer 168 coupled to the public network 112.

The domain controller 146 communicates with the public network 112 via the second APP switch 140. Additionally, the domain controller 146 can communicate via the public network 112 with the personal computer 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices such as a cellular telephone 184.

In a particular embodiment, the STB devices 116 and 124 can include an STB computer program 174 that is embedded within the STB memory device 172 and a digital video recorder (DVR) 182. The STB computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second STB device 124. For instance, in an illustrative embodiment, the account information can relate the user's account to the second STB device 124 by associating the user account with an IP address of the second STB device, with data relating to one or more twisted pairs connected with the second STB device, with data related to one or more fiber optic cables connected with the second STB device, with an alphanumeric identifier of the second STB device, with any other data that is suitable for associating second STB device with a user account, or with any combination of these. Further details of the IPTV system 100 are taught in U.S. Patent Application Publication No. 2007/0083895, the disclosure of which is hereby incorporated by reference.

In operation, the acquisition tier 106 provides television content to the STB device 116 in a plurality of video streams. Each video stream can represent a different television channel, on-demand program, or the like. To display a particular television channel at the display device 118, the STB device 116 sends a request to the acquisition tier 106 for the video stream associated with the channel. The acquisition tier 106 provides the requested video stream to the STB device 116, which processes the video stream for display at the display device 118.

The connection between the access network 166 and the STB device 116 has a limited bandwidth so that only a limited number of video streams can be transmitted to the STB device 116. The bandwidth limitation can depend on a number of factors, including the format of the video streams. For example, high definition video streams typically require a larger video stream (i.e. a video stream having more information) than a standard definition video stream. Accordingly, the number of video streams that can be transmitted to the STB device 116 depend on this bandwidth limitation.

Requests for video streams can result from, for example, a request from the remote control device 120 to change a channel being displayed at the display device 118. This request from a user to receive a particular video stream is referred to herein as a channel request. In response to receiving a channel request, the STB device 116 determines whether transmission of the requested video stream would result in the bandwidth limitation being exceeded. If not, the STB device 116 requests the video stream from the acquisition tier 106. If the bandwidth limitation would be exceeded, the STB device 116 determines which video streams are being received and displays a list of the video streams at the display device 118. The STB device 116 can also display an option to cancel transmission of one or more of the received video streams. With the remote control 120 or another input device, the user can select which of the listed video streams to cancel. In response, the STB device 116 sends a request to the acquisition tier 106 to cancel transmission of the selected video stream. The STB device 116 also sends a request for the video stream associated with the channel request. Accordingly, the user can choose which streams are transmitted to the STB device 116, resulting in an improved user experience.

Figure 2:
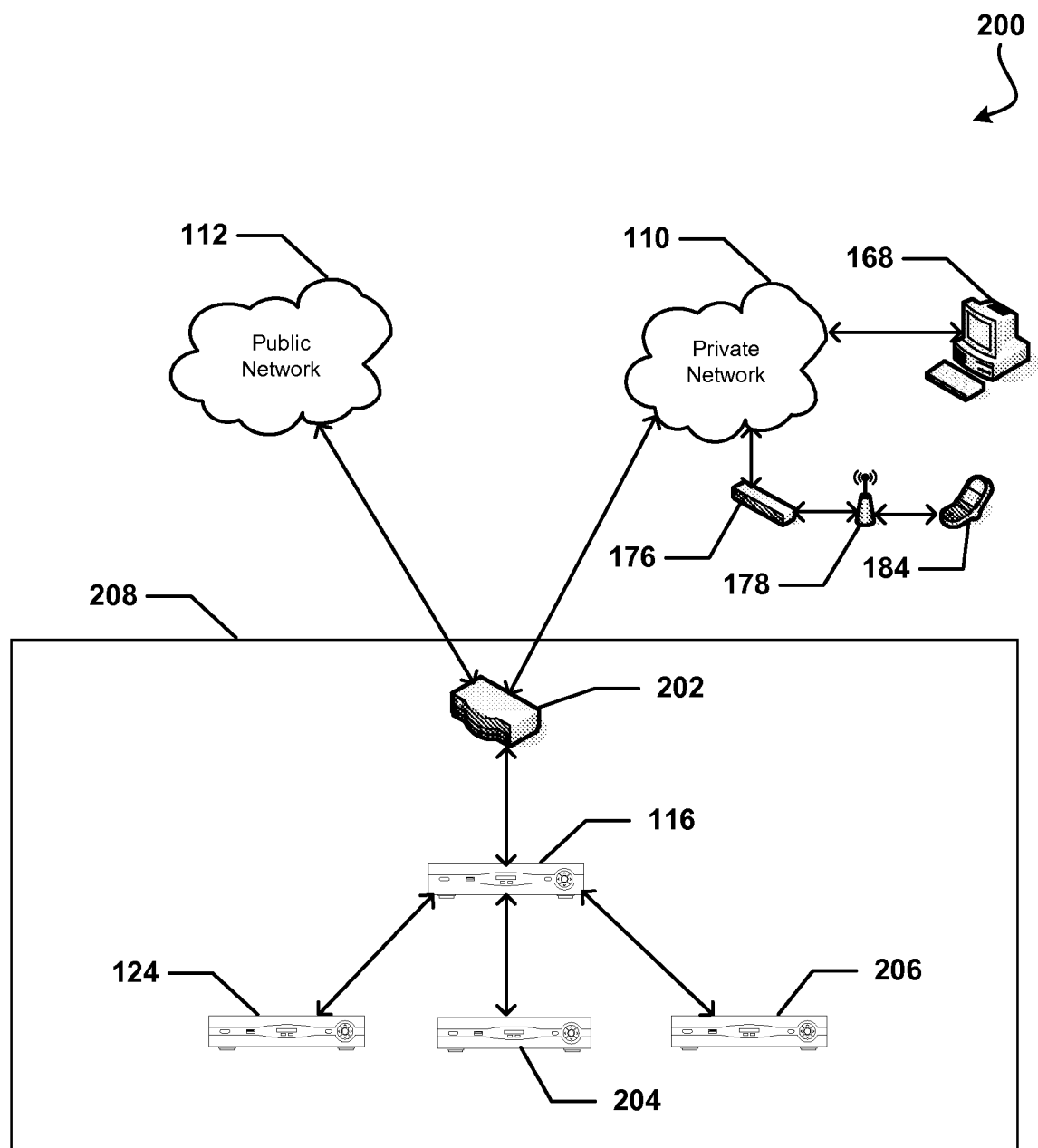
FIG. 2 is a block diagram of a particular embodiment of a video monitoring system in the IPTV system of FIG. 1.

FIG. 2 shows a video monitoring system 200 including a residential gateway 202, and STB devices 116, 124, 204, and 206. The residential gateway 202 can be a bridge, a router, an Intelligent Network Interface Device (INID), or any similar device. The residential gateway 202 is in communication with the private network 110, the public network 112, and the STB device 116. The STB device 116 is also in communication with the STB devices 124, 204, and 206. A Cat5 cable, a high bandwidth wireless connection, a coaxial cable, or any similar type of cable and/or connection can be used to connect the STB device 116 to the residential gateway 202 and the STB devices 116, 204, and 206. The personal computer 168 and the cellular telephone 184 access the private network 110 through a secure login, and communicate with the STB device 116 through the private network and the residential gateway 202. As stated above, the cellular telephone 184 gains access to the private network 110 by the wireless network access point 178 and the data network 176.

The residential gateway 202 provides access, security information, and identification information for the STB device 116 to the private network 110 and the public network 112. The residential gateway 202 also transmits data between the STB device 116 and the private network 110 and the public network 112.

A customer premises 208 includes the STB devices 116, 124, 204, and 206, which are each associated with an individual display device (not shown). In operation, each of the STB devices 116, 124, 204, and 206 can receive channel requests for the associated display devices. The STB devices 124, 204, and 206 send these requests to the STB device 116, which in turn requests the associated video streams from the IPTV system 100.

In response to receiving a channel request either from a remote control, another input device, or from one of the STB devices 124, 204, and 206, the STB device 116 determines whether the video stream bandwidth for the IPTV system 100 would be exceeded. If not, the STB device 116 requests the video stream from the acquisition tier 106. If transmitting the requested video stream would result in the video stream bandwidth being exceeded, the STB device 116 determines the video streams being transmitted to the customer premises 108 and provides a list of the video streams for display. The list can be displayed via any of the STB devices 116, 124, 204, and 206. In one embodiment, the list is displayed at the display device associated with the STB device that sent the channel request.

The STB device 116 can also provide the list of channels being transmitted in response to a user request. For example, a user can use a remote control device associated with one of the STB devices 116, 124 204, and 206 to request display of a list of video streams being received. In response, the STB device 116 determines the video streams being transmitted to the customer premises 208 and provides the list for display. This allows a user to determine which video streams are being transmitted to the customer premises 208 without requesting a new video stream. Additionally, a user can use a peripheral device, such as the personal computer 168, the cellular telephone 184, or a personal digital assistant (not shown), to send a request to the STB device 116 and to display the list of channels being transmitted to the customer premises 208. This allows the user to monitor the channels being transmitted to the customer premises 208 from a remote location.

Figure 3:
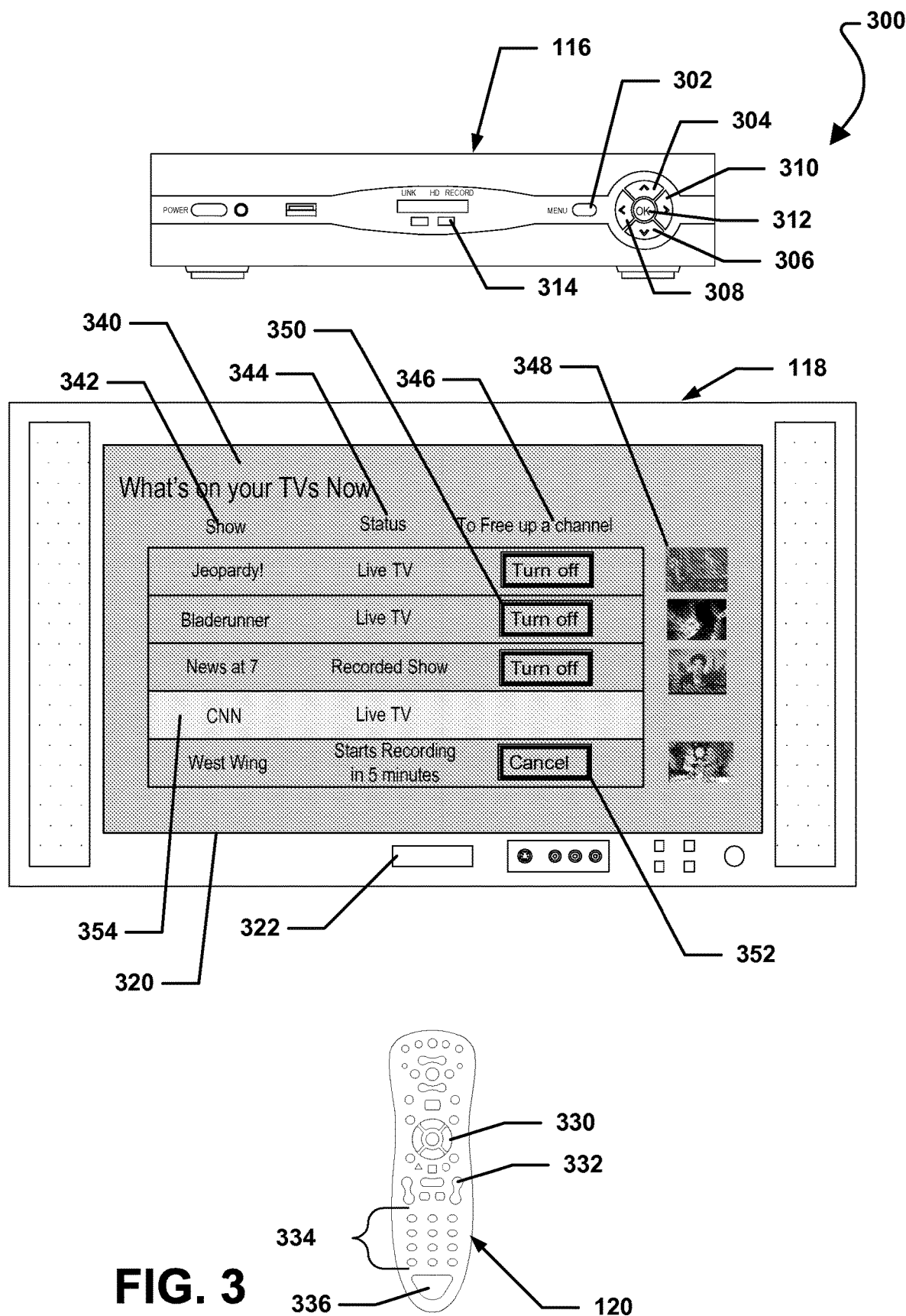
FIG. 3 is a block diagram of a particular embodiment of a display of the video monitoring system of FIG. 2.

FIG. 3 shows a block diagram of a particular embodiment of a video system 300 including the STB device 116, the display device 118, and the remote control device 120. The STB device 116 includes a menu button 302, an up button 304, a down button 306, a left button 308, a right button 310, and an OK button 312. The STB device 116 also includes a receiver 314 incorporated therein. In a particular embodiment, the receiver 314 can be an IR receiver, an RF receiver, or a similar receiver.

The remote control device 120 includes a plurality of buttons. For example, the remote control device 120 includes a directional keypad 330 used to navigate within the various content windows provided by the STB device 116. Moreover, the remote control device 120 includes a channel/page (CH/PG) up/down button 332. The CH/PG button 332 can be used to change the channel at the STB device 116 or navigate from page-to-page within a content guide provided by the STB device. The remote control device 120 also includes a numerical keypad 334 having a plurality of buttons that are individually numbered 1, 2, 3, 4, 5, 6, 7, 8, 9, and 0. In a particular embodiment, the numerical keypad 334 is used to input a specific channel number or to input a personal identification number (PIN). The display device 118 includes a display screen 320 and an infrared (IR) receiver, a radio frequency (RF) receiver, or a similar receiver 228. The display 340 includes a plurality of information about the video streams being displayed and includes a show name field 342, a show status field 344, an option field 346, and a subset video stream field 348 for each video stream being received. The show name field 342 presents the user with a title of a video stream, while the show status field 344 can display various status information for the video stream, including whether the video stream is being shown, recorded, or scheduled for recording. The option field 346 provides a termination option 350 and/or a cancel option 352 as soft buttons that are selectable by a user. The subset video stream field 348 can be a thumbnail video stream, to present the user with video associated with the video stream. The display 340 also includes a new video stream field 354, to present information associated with a requested video stream that is not yet being transmitted to the STB device 116. In a particular embodiment, the new video stream field 354 is in a different color than the video streams currently being displayed or recorded.

In operation, the display 340 is presented in response to a channel request that would result in a bandwidth limitation of the IPTV system 100 being exceeded. The display 340 can be also presented in response to the user selecting the menu button 302 on the STB device or the list button 336 on the remote control device 120. The show name field 342, the show status field 344, and the subset video stream field 348 allow the user to determine which video streams are being transmitted to the STB device 116, and to allow the user to select a video stream to terminate. For example, in response to reviewing the information on the display 340, the user can select the termination option 350 associated with the "News at 7" being viewed as a recorded show, or the user can select the cancel option 352 associated with the "West Wing" that is set to be recorded in 5 minutes. In response to selection of the termination option 350 or the cancellation option 352, the STB device 116 sends a request to the acquisition tier 106 to terminate transmission of the associated video stream. The STB device 116 also sends a request to the acquisition tier 106 for the new video stream requested by a user.

The STB device 116 can require security information, such as a password or a personal identification number (PIN) before requesting that transmission of a video stream be terminated. The security information can be entered using the remote control device 120. In response to determining the security information is accurate, the STB device 116 can send a message to the STB devices 124, 204, and 206 indicating that the video stream is going to be terminated. Upon the termination of the video stream, the STB device 116 also can send an alternate video stream to the STB device 124, 204, or 206.

Figure 4:
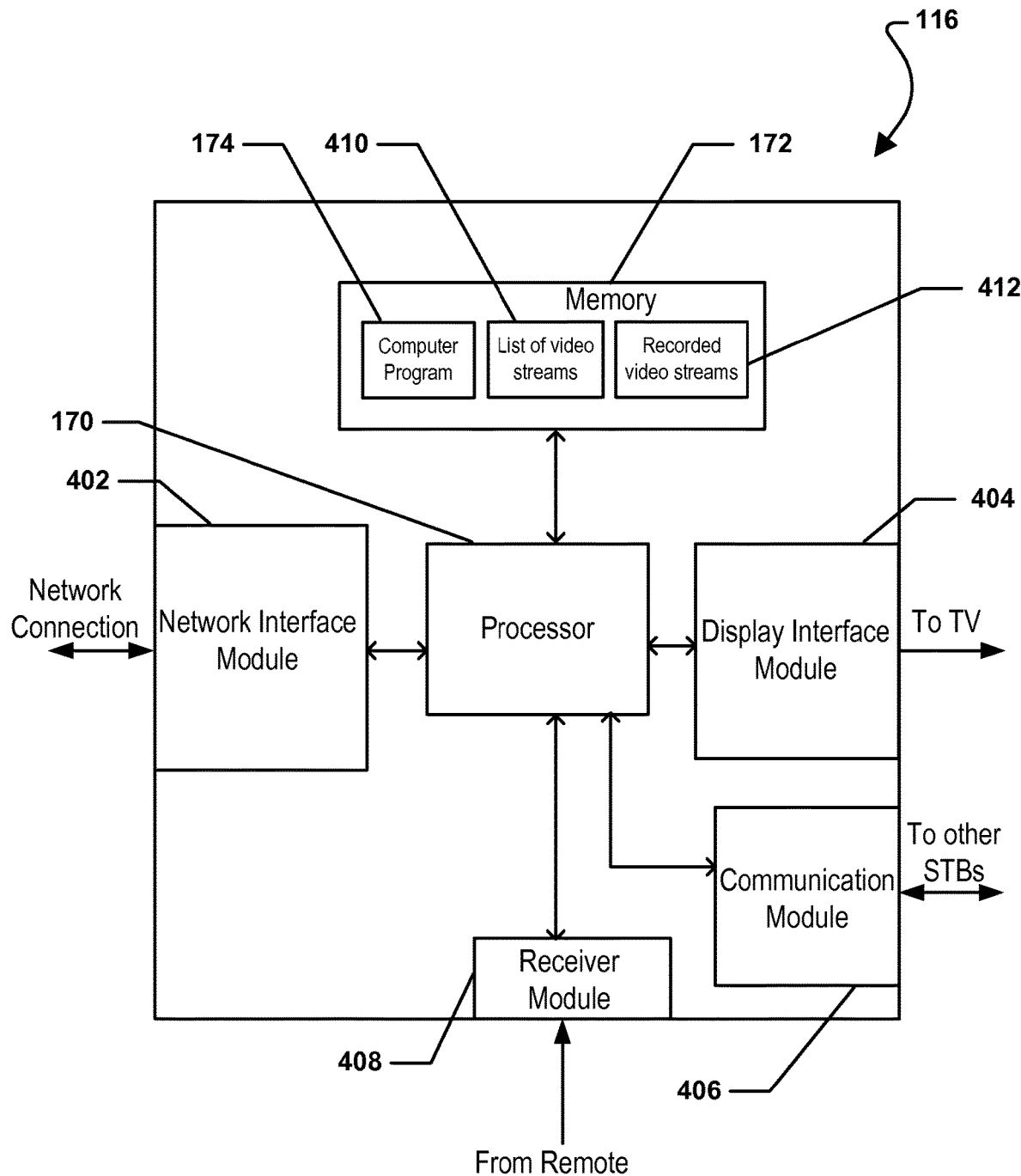
FIG. 4 is a block diagram of a particular embodiment of a set-top box in the video monitoring system of FIG. 2.

FIG. 4 shows a particular embodiment of the STB device 116 including the STB processor 170, the STB memory device 172, the STB computer program 174, a network interface module 402, and a display interface module 404. The STB device 116 also includes a communication module 406 and a receiver module 408. The network interface module 402 is in communication with the residential gateway 202 and is coupled to the STB processor 170. The STB memory device 172 includes the STB computer program 174, a list of video streams 410, and a recorded video stream 412. The STB memory device 172 is coupled to the STB processor 170. The display interface module 404 is coupled to the STB processor 170, and adapted to communicate with a display device (not shown). The communication module 406 is also coupled to the STB processor 170, and adapted to communicate with the STB devices 124, 204, and 206. The receiver module 408 is coupled to the STB processor 170, and is adapted to communicate with the remote control device 120.

The network interface module 402 is adapted to access the private network 110 or the public network 112 in the IPTV system 100 through the residential gateway 202. Accordingly, the network interface module 402 provides a physical and logical link layer for communications between the residential gateway 202 and the STB device 116. In an embodiment, these communications are implemented via transmission and reception of packets, and the network interface module 402 is responsible for the physical reception and transmission of the packets. The network interface module 402 can also perform additional communication overhead functions, such as error checking, flow control, or the like.

The STB memory device 172 is a computer memory, including a volatile memory such as a random access memory (RAM) or non-volatile memory such as a flash memory or a hard disk. The STB memory device 172 is configured to store information including the STB computer program 174, the list of the plurality of video streams being displayed 410, and the recorded video streams 412 received from the IPTV system 100. The STB memory device 172 can also store recorded video streams 412.

The STB processor 170 is a data processor configured to execute computer instructions, control other modules of the STB device 116, or the like. In an embodiment, the STB processor 170 is a video processor configured to process received video streams and to place the video streams in an appropriate format for display. The STB processor 170 can also be configured to manage channel requests received at the STB device 116. For example, the processor 170 can be configured to determine which video streams should be requested from the acquisition tier 106 based on a received request.

The display interface module 404 is a processor module configured to receive display information from the STB processor 170 and control the display device 118, based on the received information. Accordingly, the display interface module 404 provides a physical layer for communication of display information to the display device 118.

The communication module 406 provides an interface between the STB device 116 and the STB devices 124, 204, and 206. The communication module 406 thus provides a physical and logical link layer for communications between the devices. Accordingly, the communication module 406 can receive channel requests form the STB devices 124, 204, and 206 and provide video streams responsive to these requests. The receiver module 408 is configured to provide a physical communications layer between the STB device 116 and the remote control device 120. Accordingly, the receiver module 408 is configured to receive infrared signals from the remote control device 120 and transform these signals to an appropriate form for processing at the STB device 116.

During operation, the IPTV system 100 transmits a plurality of video streams to the network interface module 402. The network interface module 402 receives the video streams and provides them to the STB processor 170. The STB processor 170 determines if a received video stream should be displayed at the display device 118 and, if so, provides the video stream to the display interface module 404. The STB processor 170 can also route video streams to one of the STB devices 124, 204, and 206 via the communication module 406. In addition, the STB processor 170 can record a video stream by saving the video stream at the STB memory device 172 in the recorded video streams 412. Furthermore, the STB processor 170 maintains the list of video streams stored at the STB memory device 172. The list of video streams 410 can be used as a basis for a displayed list of video streams.

For example, the STB processor 170 can receive a request to display a list of transmitted video streams. These requests can be received from the remote control device 120, via the receiver module 408, from one of the STB device 124, 204, or 206 via the communication module 406, or via a peripheral device via the network interface module 402. The request is sent to the STB processor 170, which accesses the list of video streams 410 in the STB memory device 172 to retrieve the list of video streams 410 and creates a display based on the list. The STB processor 170 sends the display to the display interface module 404, the communication module 406, or the network interface module 402 depending on the source of the request.

The STB processor 170 can also receive a channel request from the remote control device 120 via the receiver module 408 or from one of the STB devices 124, 204, or 206 via the communication module 406. The channel request can be a request to access a new video stream, change the format of a video stream, or to record a video stream. Upon receiving the channel request, the STB processor 170 determines if transmission of the new video stream would exceed the bandwidth. If not, the network interface module 402 requests the new video stream from the acquisition tier 106. However, if transmission of the new video stream would exceed the bandwidth limit, the STB processor 170 retrieves the list of video streams 410 being transmitted, and provides them for display on the display device 118, or the STB devices 124, 204, or 206 depending on the source of the channel request.

Further, the STB processor 170 can receive a request to terminate transmission of a video stream or to cancel a recording of a video stream from the remote control device 120 via the receiver module 408 or from one of the STB devices 124, 204, or 206 via the communication module 406. The STB processor 170 sends the termination request to the network interface module 402 for communication to the acquisition tier 106. In addition, the STB processor 170 provides a termination notification message, either to the display interface module 404 for display at the display device 118 or to one of the STB devices 124, 204, or 206 depending on the source of the termination request. Upon the termination of the video stream, the display interface module 404 and the communication module 406 can send a new video stream received by the network interface module 402 to the display device 120 and the STB devices 124, 204, and 206.

Figure 5:
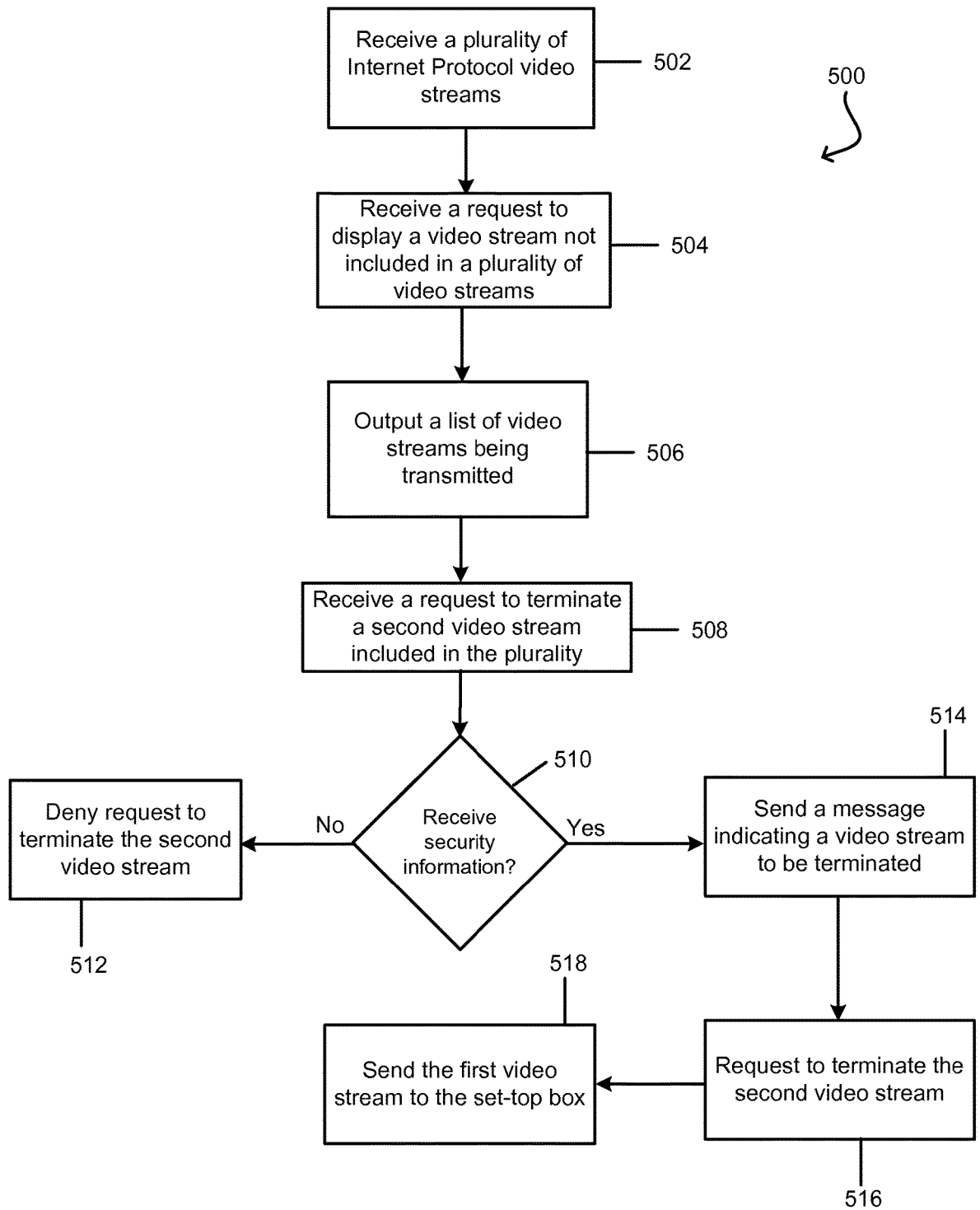
FIG. 5 is a flow chart of a particular embodiment of a method for accessing a video stream over an IPTV system.

FIG. 5 illustrates a flow diagram of a particular embodiment of a method 500 for accessing a video stream in the IPTV system 100. At block 502, a STB device receives a plurality of video streams in an Internet Protocol format from the IPTV system 100. The STB device may be an IPTV receiver or any similar device for receiving video streams. The STB device receives a request to display, record, or change the format of a first video stream not included in a plurality of video streams being transmitted to the STB device at block 504. The request can be received from a remote control device and/or a STB device. At block 506, the STB device outputs a list of video streams being transmitted. The STB device receives a request to terminate transmission of a second video stream included in the plurality of video streams being displayed at block 508. The request to terminate can be received from a remote control device, a STB device, a personal computer, a cellular telephone, or personal digital assistant.

At block 510, the STB device determines if security information permitting termination of the second video stream is received. The security information can be a personal identification number (PIN), a password, and the like. If the security information is not received, then the STB device denies the request to terminate transmission of the second video stream included in the plurality of video streams being displayed at block 512. At block 514, if the security information is received and verified, then the STB device sends a message to a second STB device displaying the second video stream indicating that the second video stream is to be terminated. The STB device sends a request to the IPTV system 100 to terminate transmission of the second video stream at block 516. At block 518, the STB device sends the first video stream to the STB device.

Figure 6:
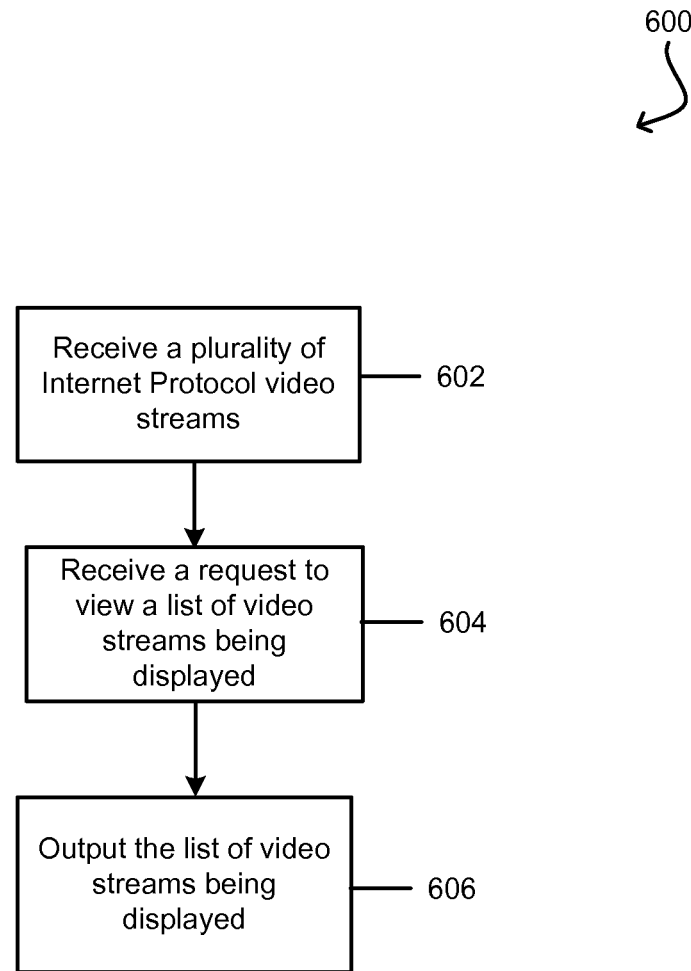
FIG. 6 is a flow chart of a particular embodiment of a method for displaying a list of video streams.

FIG. 6 illustrates a flow diagram of a particular embodiment of a method 600 for outputting a list of video streams being displayed. At block 602, a STB device receives a plurality of video streams in an Internet Protocol format. The STB device receives a request to view the list of video streams being displayed by a plurality of STB devices at block 604. The request can be received from a remote control device, a STB device, and/or a peripheral device in communication with the STB device. The peripheral device may be a cellular telephone, a personal computer, and/or a personal digital assistant. At block 606, the STB device outputs the list of video streams being displayed to a display device, the STB device, or the peripheral device.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGS. are to be regarded as illustrative rather than restrictive.

The Abstract of the Disclosure is provided to comply with 37 C.F.R. § 1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:

receiving, by a processing system including a processor, a plurality of video streams;

providing, by the processing system, a plurality of devices access to the plurality of video streams;

responsive to determining that fulfilling a content request would result in exceeding a predetermined bandwidth limitation, providing, by the processing system, a listing of the plurality of video streams for display at a device of the plurality of devices, wherein a user interface associated with the display at the device enables termination of a selected one of the plurality of video streams;

receiving, by the processing system via the device, input indicating a first request to terminate a selected video stream of the plurality of video streams; and transmitting, by the processing system, a message to the device indicating that the selected video stream is to be terminated.

2. The method of claim 1, wherein the plurality of video streams are received from a media distribution system, and wherein the predetermined bandwidth limitation corresponds to a limitation of the processing system, thereby limiting a number of video streams that can be received by the processing system from the media distribution system.

3. The method of claim 2, further comprising transmitting, by the processing system, a second request to the media distribution system to terminate the selected video stream according to the first request.

4. The method of claim 1, wherein the content request requires an additional video stream.

5. The method of claim 1, wherein the termination of the selected video stream is conditioned upon authenticating security information associated with the device.

6. The method of claim 1, further comprising transmitting, by the processing system, an alternate video stream to at least one of the plurality of devices in response to the termination of the selected video stream.

7. The method of claim 1, wherein the plurality of devices comprise a media processor, and wherein the content request comprises a channel request from the media processor.

8. The method of claim 7, wherein the channel request is to change a format of a video stream.

9. The method of claim 1, wherein the listing comprises an identifier for each of the plurality of video streams.

10. The method of claim 9, wherein the identifier comprises, for each of the plurality of video streams, a title and a thumbnail of the respective video stream.

11. A device comprising:

a processing system including a processor; and a memory that stores executable instructions that, when executed by the processing system, facilitate performance of operations comprising:

receiving a plurality of video streams from a media distribution system;

providing a plurality of devices access to the plurality of video streams;

receiving a content request;

responsive to determining that fulfilling the content request would result in exceeding a predetermined bandwidth limitation, providing a listing of the plurality of video streams for display at a device of the plurality of devices, wherein a user interface associated with the display at the device enables termination of a selected one of the plurality of video streams;

receiving, via the device, input indicating a request to terminate a selected video stream of the plurality of video streams; and transmitting a message to the device indicating that the selected video stream is to be terminated.

12. The device of claim 11, wherein the predetermined bandwidth limitation corresponds to a limitation of the processing system, thereby limiting a number of video streams that can be received by the processing system from the media distribution system.

13. The device of claim 11, wherein the content request requires an additional video stream.

14. The device of claim 11, wherein the termination of the selected video stream is conditioned upon authenticating security information associated with the device.

15. The device of claim 11, wherein the operations further comprise transmitting an alternate video stream to at least one of the plurality of devices in response to the termination of the selected video stream.

16. The device of claim 11, wherein the listing comprises, for each of the plurality of video streams, a title and a thumbnail of the respective video stream.

17. A non-transitory machine-readable medium comprising executable instructions that, when executed by a processing system including a processor, facilitate performance of operations comprising:

receiving a plurality of video streams;

providing a plurality of devices access to the plurality of video streams;

receiving a content request requiring an additional video stream;

responsive to determining that fulfilling the content request would result in exceeding a predetermined bandwidth limitation, providing a listing of the plurality of video streams for display at a device of the plurality of devices, wherein a user interface associated with the display at the device enables termination of a selected one of the plurality of video streams;

receiving, via the device, input indicating a request to terminate a selected video stream of the plurality of video streams; and transmitting a message to the device indicating that the selected video stream is to be terminated.

18. The non-transitory machine-readable medium of claim 17, wherein the plurality of video streams are received from a media distribution system, and wherein the predetermined bandwidth limitation corresponds to a limitation of the processing system, thereby limiting a number of video streams that can be received by the processing system from the media distribution system.

19. The non-transitory machine-readable medium of claim 17, wherein the termination of the selected video stream is conditioned upon authenticating security information associated with the device.

20. The non-transitory machine-readable medium of claim 17, wherein the listing comprises, for each of the plurality of video streams, a title and a thumbnail of the respective video stream.

* * * * *